(12) United States Patent
Song

(10) Patent No.: US 7,891,711 B2
(45) Date of Patent: Feb. 22, 2011

(54) REVOLVING COMPENSATOR OF HIGH PRESSURE FOR PIPE

(76) Inventor: Zhanggen Song, Yixing City Hongxin Heat Insulation Pipe Co., Ltd., West to Wanshi Town, Yixing, Jiangsu (CN) 214212

( * ) Notice: Subject to any disclaimer, the term of this patent is extended or adjusted under 35 U.S.C. 154(b) by 163 days.

(21) Appl. No.: 12/297,100

(22) PCT Filed: Feb. 25, 2007

(86) PCT No.: PCT/CN2007/000602

§ 371 (c)(1), (2), (4) Date: Oct. 14, 2008

(87) PCT Pub. No.: WO2008/019546

PCT Pub. Date: Feb. 21, 2008

(65) Prior Publication Data

US 2009/0134620 A1    May 28, 2009

(30) Foreign Application Priority Data

Aug. 11, 2006   (CN) ...................... 2006 1 0041301

(51) Int. Cl.
*F16L 19/06* (2006.01)
(52) U.S. Cl. .................. 285/343; 285/98; 285/108; 285/342; 285/374
(58) Field of Classification Search ............ 285/148.18, 285/225, 339, 343, 349, 363–364, 405–406, 285/408, 95, 98, 108, 113, 342, 374
See application file for complete search history.

(56) References Cited

U.S. PATENT DOCUMENTS

| | | | | | |
|---|---|---|---|---|---|
| 364,947 | A | * | 6/1887 | Moore ..................... | 277/620 |
| 1,006,490 | A | * | 10/1911 | Lord ........................ | 277/620 |
| 1,143,321 | A | * | 6/1915 | Robinson ................. | 285/264 |
| 1,423,754 | A | * | 7/1922 | Clark ....................... | 285/413 |
| 1,868,014 | A | * | 7/1932 | Lucas ...................... | 285/111 |

(Continued)

FOREIGN PATENT DOCUMENTS

CN    ZL 98227061.5    9/1999

(Continued)

*Primary Examiner*—Aaron Dunwoody
*Assistant Examiner*—Fannie Kee
(74) *Attorney, Agent, or Firm*—Global IP Services; Tianhua Gu

(57) ABSTRACT

A rotary compensating device used in a pipe under high pressure comprises an inner pipe (1), a sealing gland (3), a sealing seat (5) and a connecting pipe (7). One end of the inner pipe (1) is inserted into the connecting pipe (7), and the connecting pipe (7) is fixedly connected with one end of the sealing seat (5) and is installed on the outer surface of the inner pipe (1). The inner pipe (1) is provided with an annular outer flange (8), and the sealing seat (5) is provided with an annular inner flange (9). The sealing gland (3) is installed on the outer surface of the inner pipe (1) and inserted into the other end of the sealing seat (5) to abut against a torus sealing member (4). The sealing gland (3) connects with the sealing seat (5) via a connecting member (2). A sealing cavity is formed between the sealing seat (5) and the inner pipe (1), and an end face sealing member (6) is installed in the sealing cavity.

4 Claims, 1 Drawing Sheet

U.S. PATENT DOCUMENTS

| | | | | |
|---|---|---|---|---|
| 1,873,620 | A | * | 8/1932 | Moore ......................... 277/620 |
| 1,986,357 | A | * | 1/1935 | Perry ........................... 285/53 |
| 2,037,084 | A | * | 4/1936 | Moore ......................... 277/623 |
| 2,148,038 | A | * | 2/1939 | Raybould ................... 277/620 |
| 3,712,648 | A | * | 1/1973 | Clifford ...................... 285/321 |
| 4,832,379 | A | * | 5/1989 | Smith et al. .................. 285/323 |
| 4,867,488 | A | * | 9/1989 | Jones ......................... 285/328 |

FOREIGN PATENT DOCUMENTS

| | | |
|---|---|---|
| CN | ZL 02258709.8 | 12/2003 |

\* cited by examiner

REVOLVING COMPENSATOR OF HIGH PRESSURE FOR PIPE

BACKGROUND OF THE INVENTION

1. Field of the Invention

The present invention relates to a pipe joint, and more particularly to a pipe compensator used in a pipe, suitable for automatically compensating a length of the pipe, which is a revolving compensator of high pressure used in a pipe.

2. Related Art

Recently, due to the disadvantages of complicated structures, high cost, inconvenient installation, and small compensation quantity, conventional sleeve-type, corrugated-pipe-type, and steel-ball-type pipe compensators have been gradually replaced by a revolving compensator. Currently, the widely used revolving compensator has advantages of a simple structure, a convenient manufacturing process, and a large compensation quantity, and the details can be obtained with reference to China Patent NO. ZL982270615 and NO. ZL022587098.

However, during practical applications, it is found that the sealing structure has a problem that an end face leakage may occur, especially when a high-temperature and high-pressure medium is transferred. Therefore, the sealing structure needs to be modified, so as to meet the using requirements of pipes for transferring high-temperature and high-pressure media.

SUMMARY OF THE INVENTION

In view of the problem of the prior art that the revolving compensator has a poor sealing property under high temperature and high pressure conditions, the present invention is directed to a revolving compensator of high pressure used in pipe, which has a novel sealing structure.

The technical solution of the present invention is described as follows.

A revolving compensator of high pressure used in pipe is provided, which includes an inner pipe 1, a sealing gland 3, a sealing seat 5, and a connecting pipe 7. One end of the inner pipe 1 is inserted into the connecting pipe 7, and the connecting pipe 7 is fixedly connected to one end of the sealing seat 5 and is installed on an outer surface of the inner pipe 1. One end of the inner pipe 1 extending into the connecting pipe 7 is at least provided with an annular outer flange 8, and an inner surface of the sealing seat 5 is at least provided with an annular inner flange 9. The sealing gland 3 is installed on the outer surface of the inner pipe 1 and inserted into the other end of the sealing seat 5 to abut against a torus sealing member 4 installed between the inner surface of the sealing seat 5 and the outer surface of the inner pipe 1. The sealing gland 3 is connected to the sealing seat 5 via a connecting member 2. A sealing cavity, formed by the inner surface of the sealing seat 5, the outer surface of the inner pipe 1, the annular outer flange 8, and a side surface of the annular inner flange 9, is at least formed between the sealing seat 5 and the inner pipe 1, and an end face sealing member 6 is installed in the sealing cavity.

In order to ensure rotating smoothly during compensation, in the present invention, balls 10 are installed on the annular inner flange 9 of the sealing seat 5 contacting with the outer surface of the inner pipe 1 and/or the sealing gland 3 contacting with the outer surface of the inner pipe 1.

In order to ensure the sealing property, the sealing members 4 and 6 of the present invention are made of high-temperature and high-pressure resistant sealing materials, for example, high-purity flexible oil-immersed graphite.

For the convenience of making connections, the connecting pipe 7 of the present invention is a reducer joint, and one end of the connecting pipe 7 fixedly connected to the sealing seat 5 has a larger diameter than the other end connected to a pipe line.

The present invention has the following advantages.

Based upon a lot of tests, through analyzing the problem about the poor sealing features of the conventional revolving compensator, it is found that the end face sealing is the key point of all the problems. Therefore, in the present invention, a sealing member 6 is further installed, which is mainly used for achieving the end face sealing function, such that the high temperature and high pressure media cannot pass through the outer surface of the inner pipe 1 to enter the current torus sealing member 4, and the end face sealing effect is enhanced as the temperature and the pressure are raised. The reason lies in that, in a relatively sealed sealing cavity, since an expansion coefficient of the sealing member is larger than that of the cavity, the higher the temperature and the pressure are, the better the sealing degree between the sealing member and the end face is, and accordingly, the sealing effect turns to be more desirable. In the conventional revolving compensator, this issue is neglected, such that the end face leakage problem occurs, and as a result, the prevailing and applications of the conventional revolving compensator are restricted. The present invention successfully solves the technical problem, such that the application scope is greatly widened, which can be applied to the compensation of various medium pipes under high temperature and high pressure conditions.

In order to enhance the sealing effect, one or more end face sealing members may be adopted in the present invention, and the sealing cavity with the end face sealing member 6 installed therein may be designed into a structure with an adjustable cavity volume, which is similar to a torus sealing cavity.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
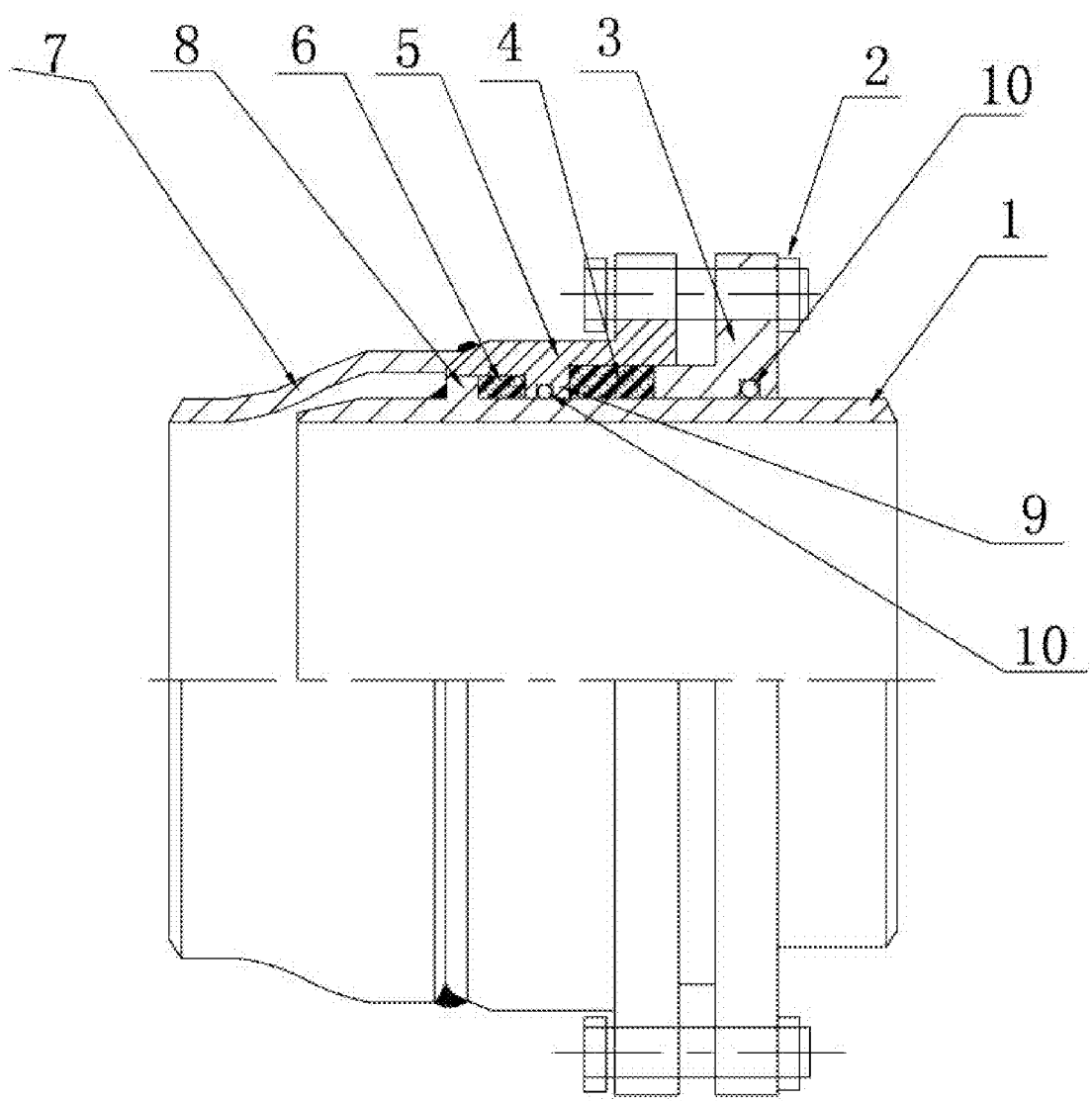
FIG. 1 is a schematic structural view of the present invention.

The present invention is further described below with reference to the accompanying drawings and embodiments.

Referring to FIG. 1, a revolving compensator of high pressure used in pipe includes an inner pipe 1, a sealing gland 3, a sealing seat 5, and a connecting pipe 7. One end of the inner pipe 1 is inserted into the connecting pipe 7, and the connecting pipe 7 may be a reducer joint commonly used in engineering. The connecting pipe 7 is welded and connected to one end of the sealing seat 5 and is installed on an outer surface of the inner pipe 1. One end of the inner pipe 1 extending into the connecting pipe 7 is provided with an annular outer flange 8 (the number of the annular outer flanges may be determined through tests according to a medium temperature and pipe pressure), and an inner surface of the sealing seat 5 is provided with an annular inner flange 9 (the number of the annular inner flanges may be determined through tests according to the medium temperature and the pipe pressure). The sealing gland 3 is installed on the outer surface of the inner pipe 1 and inserted into the other end of the sealing seat 5 to abut against a torus sealing member 4 installed between the inner surface of the sealing seat 5 and the outer surface of the inner pipe 1. The sealing gland 3 is connected to the sealing seat 5 via a connecting member 2. A sealing cavity, formed by the inner surface of the sealing seat 5, the outer surface of the inner pipe 1, the annular outer flange 8, and a side surface of the annular inner flange 9, is at least formed between the sealing seat 5 and the inner pipe 1. An end face sealing member 6 is installed in the sealing cavity. The sealing members 4 and 6 are made of high-temperature and high-pressure resistant sealing materials, for example, high-purity flexible oil-immersed graphite.

In order to ensure rotating smoothly during compensation, in practical implementations, a circle of balls 10 are installed on the annular inner flange 9 of the sealing seat 5 contacting with the outer surface of the inner pipe 1 and the sealing gland 3 contacting with the outer surface of the inner pipe 1, and the balls 10 may also be merely installed on the sealing gland 3 contacting with the outer surface of the inner pipe 1. Furthermore, the balls may not be installed at all. The reason lies in that the rotating speed is quite low during rotation, so that a relative rotating angle is rather limited, and the requirement on the rotating smoothness is not too high. Definitely, the effect will be better, if the balls 10 are installed.

During practical implementations, in order to enhance the sealing effect, it is possible to appropriately increase the numbers of the sealing member 6 and the torus sealing member 4, which can be realized by adding inner and outer annular step faces during the manufacturing process.

Those parts that are not mentioned in the present invention are the same as that of the prior art.

To sum up, the key point of the present invention lies in adding end face sealing members in the conventional revolving compensator. Those solutions for solving the leakage problem of the revolving compensator by adding end face sealing members are all considered as falling within the scope of the present invention.

What is claimed is:

1. A revolving compensator of high pressure for pipe comprising:
   an inner pipe, a sealing gland, a sealing seat with a first end and a second end, and a connecting pipe with a first end and a second end; wherein
   the inner pipe is inserted into the connecting pipe which is welded to the first end of the sealing seat installed on an outer surface of the inner pipe;
   an end of the inner pipe extending into the connecting pipe is at least provided with an annular outer flange;
   an inner surface of the sealing seat is at least provided with an annular inner flange;
   the sealing gland is installed on the outer surface of the inner pipe and inserted into the second end of the sealing seat to abut against a torus sealing member installed between the inner surface of the sealing seat and the outer surface of the inner pipe, and the sealing gland is connected to the sealing seat via a connecting member;
   a sealing cavity is formed by the inner surface of the sealing seat, the outer surface of the inner pipe and side surfaces of the annular outer flange and the annular inner flange; and
   an end face sealing member is installed in the sealing cavity.

2. The revolving compensator of high pressure for pipe according to claim 1, wherein balls are installed on the annular inner flange of the sealing seat and/or on the sealing gland for contacting the outer surface of the inner pipe.

3. The revolving compensator of high pressure for pipe according to claim 1, wherein the sealing members are made of high-temperature and high-pressure resistant sealing materials.

4. The revolving compensator of high pressure for pipe according to claim 1, wherein the connecting pipe is a reducer pipe joint, and the first end of the connecting pipe connected to the sealing seat has a larger diameter than the second end of the connecting pipe connected to a pipe line.

\* \* \* \* \*